United States Patent [19]

Selby, deceased

[11] 4,023,222

[45] May 17, 1977

[54] PONTOON BOAT WITH RETRACTABLE RUNNING GEAR

[75] Inventor: Robert M. Selby, deceased, late of Nicollet, Minn., by Irma I. Selby, executrix

[73] Assignee: Selby Manufacturing Company, Inc. (Entire), Nicollet, Minn.

[22] Filed: Dec. 29, 1975

[21] Appl. No.: 644,898

[52] U.S. Cl. .................................. 9/1.2; 214/84
[51] Int. Cl.² ........................................ B63C 13/00
[58] Field of Search ................. 9/1 T; 115/1 A; 214/501–506, 84; 280/414 R, 414 A, 414 B, 414.5

[56] References Cited

UNITED STATES PATENTS

| | | | |
|---|---|---|---|
| 2,830,718 | 4/1958 | Havins | 214/84 |
| 3,113,686 | 12/1963 | Sundin | 214/506 |
| 3,210,783 | 10/1965 | Petty | 9/1 T |
| 3,289,225 | 12/1966 | Isch et al. | 9/1 T |

FOREIGN PATENTS OR APPLICATIONS 1,469,419  2/1967  France .................. 9/1 T Primary Examiner—Trygve M. Blix
Assistant Examiner—Jesus D. Sotelo
Attorney, Agent, or Firm—Clarence A. O'Brien; Harvey B. Jacobson

[57] ABSTRACT

An elongated mobile structure is provided including a body portion and an intermediate section of the body portion is provided with elongated support arm structure having one end pivotally secured to the body portion for oscillation about a transverse axis between a depending position and a generally horizontal position with the free end of the arm structure swung toward one end of the body portion or structure. The free end of the arm structure has ground engaging support wheels journaled therefrom and an elongated lever is pivotally secured, intermediate its opposite ends to the one end of the body portion for oscillation about a horizontal transverse axis and swinging between a longitudinally extending horizontal position and an upstanding position. An elongated link is pivotally connected between the lower end portion of the arm structure and the rear end portion of the lever, whereby upward swinging of the forward end portion of the lever will exert a forward pull on the lower end of the arm structure to upwardly retract the ground engaging support wheels.

9 Claims, 6 Drawing Figures

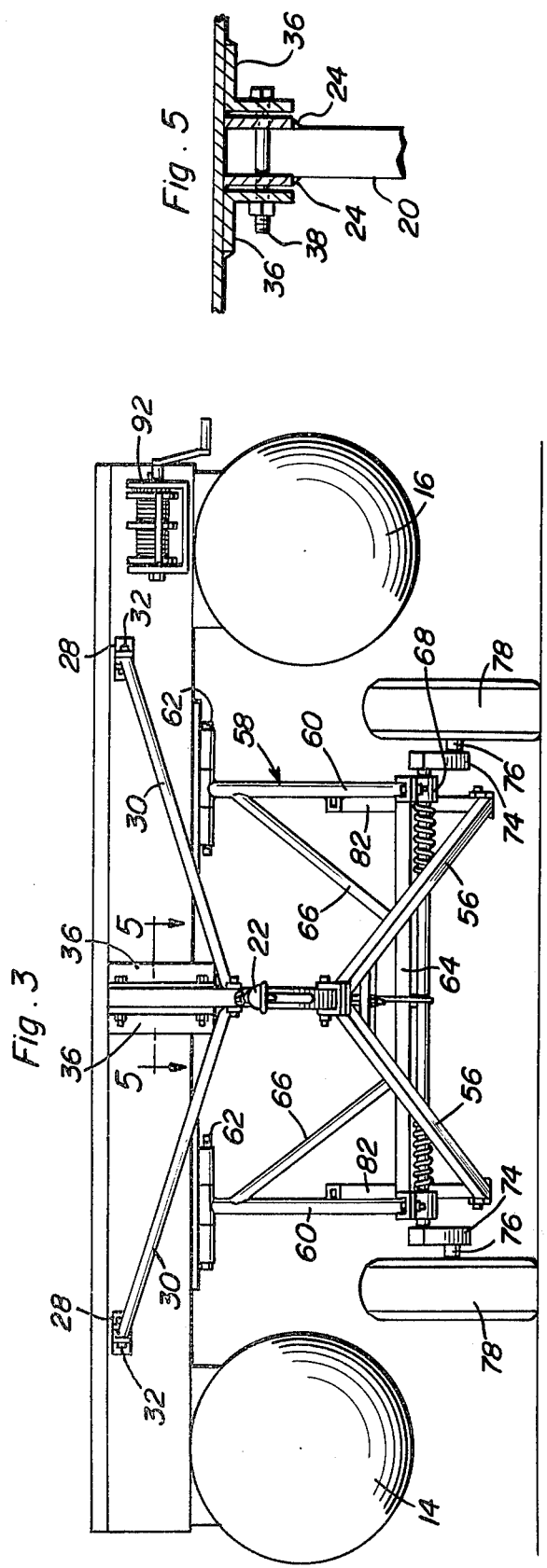
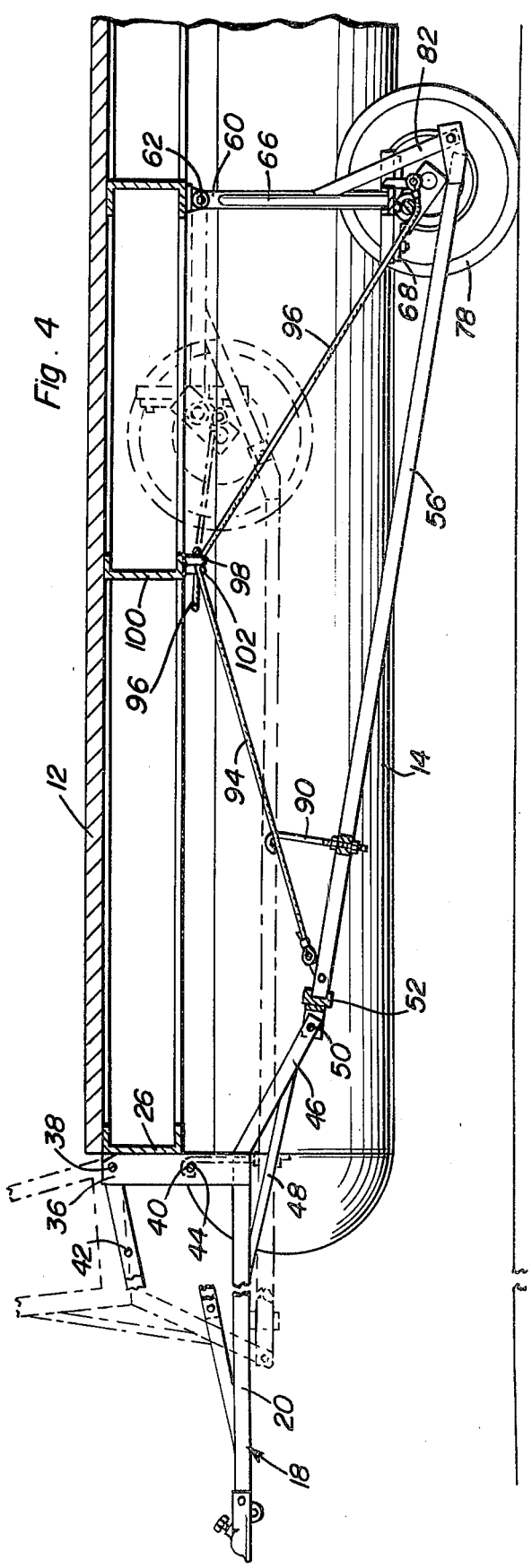

PONTOON BOAT WITH RETRACTABLE RUNNING GEAR

The present invention resides in the provision of an amphibious vehicle of the pontoon type including upwardly retractable running gear and an upwardly swingable forwardly projecting towing tongue with the towing tongue and the running gear being interconnected in a manner whereby downward swinging of the towing tongue to a forwardly projecting horizontal position will cause the running gear to be downwardly extended and upward swinging of the forward end of the towing tongue will cause the running gear to be upwardly retracted.

The forward end of the towing tongue is provided with hitch coupling structure whereby it may be releasably secured to a towing vehicle and the pontoon type of amphibious vehicle is provided with opposite side dependingly supported horizontal pontoons between which the running gear is upwardly retractable.

The main object of this invention is to provide a pontoon type of amphibious vehicle which may be readily navigated on a body of water by any suitable marine propulsion means and yet which may be readily transformed into a trailer for towing behind a draft vehicle.

Another object of this invention, in accordance with the immediately preceding object, is to provide an amphibious vehicle with supplemental means, other than the pivotally supported towing tongue, for raising and lowering the running gear as well as the towing tongue.

A still further object of this invention is to provide an amphibious vehicle with retractable running gear of a type supporting the associated wheels for up-and-down shifting and yieldingly biasing the wheels toward lower limit positions.

A final object of this invention to be specifically enumerated herein is to provide an amphibious vehicle in accordance with the preceding objects and which will conform to conventional forms of manufacture, be of simple construction and easy to use so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 3 is an enlarged fragmentary front elevational view of the amphibious vehicle with the towing tongue and running gear in the lowered operative positions;

FIG. 4 is an enlarged fragmentary longitudinal vertical sectional view taken substantially upon the plane indicated by the section line 4—4 of FIG. 2 and with alternate raised positions of the towing tongue and running gear illustrated in phantom lines;

FIG. 5 is a fragmentary enlarged horizontal sectional view taken substantially upon the plane indicated by the section line 5—5 of FIG. 3.

Figure 6:
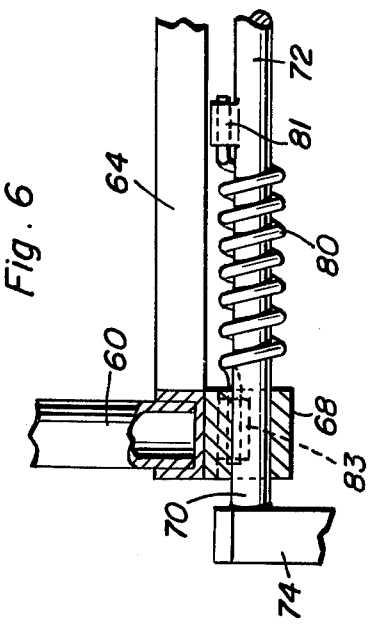
FIG. 6 is a fragmentary enlarged vertical sectional view illustrating the manner in which the crank axle is yieldingly biased toward an angular position thereof with the crank arms carried thereby in rearwardly and downwardly inclined positions.

Referring now more specifically to the drawings, the numeral 10 generally designates the amphibious vehicle of the instant invention. The vehicle 10 includes a platform structure or body portion referred to in general by the reference numeral 12 and a pair of opposite side longitudinally extending horizontal pontoons 14 and 16 dependingly supported from the opposite side marginal portions of the platform structure.

Figure 2:
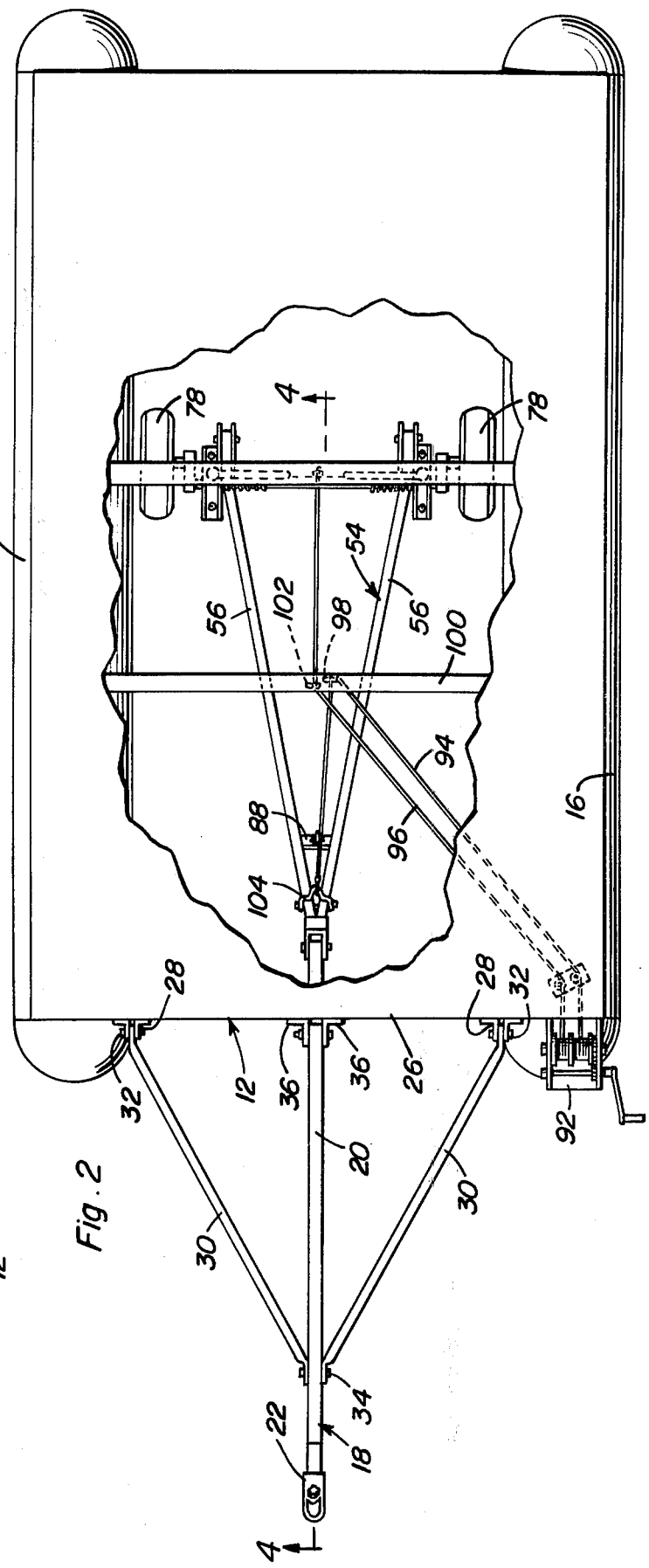
FIG. 2 is a top plan view of the amphibious vehicle with the towing tongue and running gear in downwardly displaced operative positions, portions of the platform of the pontoon vehicle being broken away to more clearly illustrate the relative positions of the running gear components.

A forwardly projecting towing tongue or lever structure referred to in general by the reference numeral 18 is provided and includes a main longitudinal beam 20 provided with a hitch coupling member 22 at its forward end and secured between a pair of upstanding opposite side plates 24 at its rear end. In addition, the forward transverse member 26 of the platform structure 12 has a pair of mounting brackets 28 secured to opposite side portions thereof in horizontal registry with each other and the rear ends of a pair of forwardly convergent bracing arms 30 are pivotally secured to the mounting brackets 28 as at 32. The forward ends of the bracing arms 30 are secured to opposite side portions of the forward end of the main beam 20 at a point spaced rearward of the forward terminal end thereof as at 34. A pair of angle brackets 36 are secured to the forward transverse member 26 in an upstanding relation and the upper ends of the plates 24 are pivotally secured between the upper ends of the angle brackets 36 by means of a pivot fastener 38. The lower end portions of the angle brackets 36 are provided with aligned transverse horizontal bores 40 and the plates 24 are provided with corresponding bores 42 which are registrable with the bores 40 in order that a removable latching pin 44 may be secured through the bores 40 and 42 to retain the towing tongue 18 in the solid line position thereof illustrated in FIGS. 2 and 4 of the drawings.

The rear end portion of the main beam 20 includes a rearwardly and downwardly inclined terminal end 46 which is braced relative to the forward end portion of the beam 20 by means of a brace 48. The rear end of the rearwardly and downwardly rear end portion of the beam 20 is pivotally secured as at 50 to a fixture 52 carried by the forward apex end of a rearwardly opening V-shaped radius arm assembly referred to in general by the reference numeral 54 and including a pair of rearwardly divergent arms 56. The radius arm assembly 54 defines a connecting link between the pivot pin or fastener 50 and the lower end of a depending arm structure referred to in general by the reference numeral 58. The arm structure 58 includes a pair of upstanding opposite side arms 60 pivotally secured to the platform 26 at their upper ends as at 62 for oscillation about horizontal transverse axes and the lower ends of the arms 60 are interconnected by means of a horizontal transverse brace 64 extending therebetween. The upper ends of the arms 60 are braced relative to midportions of the brace 64 by means of inwardly and downwardly convergent brace members 66.

The opposite ends of the transverse brace 64 include journal blocks 68 which rotatably journal the opposite ends of the center portion 70 of a crank axle 72 including opposite end crank arms 74 whose free ends are provided with stub axle portions 76 on which ground engaging support wheels 78 are journaled. Coiled torsion springs 80 are disposed about the ends of the central portion of the axle 72 and connected to the latter, as at 81, and the corresponding journal block 68, as at 83, so as to yieldingly bias the crank arms 74 toward rearwardly and downwardly inclined positions.

The rear ends of the arms 56 are pivotally secured to the lower ends of depending braces 82 carried by the arms 60 and thus upward swinging movement of the forward end of the main beam 20 toward the phantom line position illustrated in FIG. 4 will swing the lower ends of the arms 60 forwardly to the phantom line position illustrated in FIG. 4 in order to upwardly retract the wheels 78 between the pontoons 14 and 16.

The forward ends of the arms 56, adjacent the apex end of the radius arm assembly 54, are interconnected by means of a short transverse brace 88 extended therebetween and an inverted upwardly projecting J-shaped hook 90 is supported from the brace 88 and is engageable with the latch pin 44 after the forward end of the beam 20 has been swung upward to the phantom line position thereof illustrated in FIG. 4. Accordingly, the hook 90 serves to maintain the forward end of the radius arm assembly 54 in an elevated position when the towing tongue 18 is in its raised inoperative position.

Figure 1:
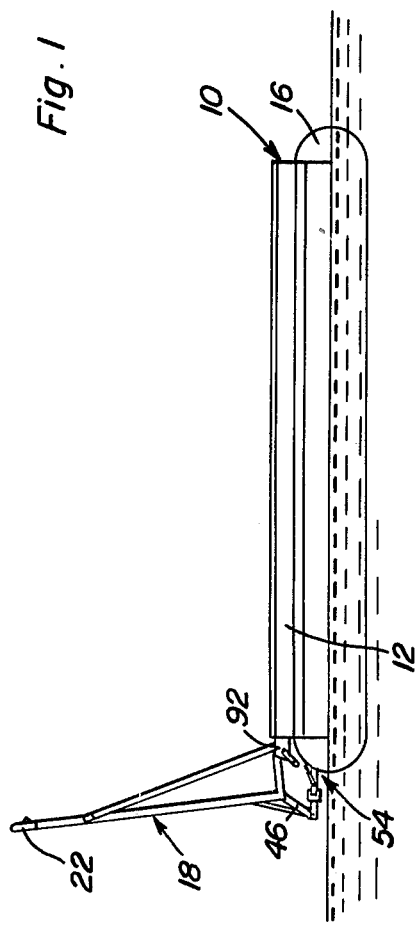
FIG. 1 is a side elevational view of the amphibious vehicle of the instant invention floating on a body of water and with the towing tongue and wheeled running gear in upwardly retracted positions.

With attention now invited more specifically to FIGS. 1, 3 and 4 of the drawings, there may be seen a double sheave winch assembly 92 mounted on the left side end of the forward transverse member 26. Flexible cables 94 and 96 are oppositely wound on the double sheaves of the winch assembly 92 and the cable 94 is slidably received through a first guide 98 carried by a transverse member 100 of the platform 26 and secured to an anchor 104 carried by the forward apex portion of the radius arm assembly 54. The cable 96 is slidably received through a second guide 102 supported from the transverse brace 100 and is secured to the center of the transverse brace 64.

When it is desired to haul the amphibious vehicle 10 from the water, the brake (not shown) of the winch assembly 92 may be released and the forward end portion of the towing tongue 18 may be swung forwardly and downwardly from the position thereof illustrated in FIG. 1 of the drawings after the locking pin 44 has been removed to release the hook 90. After the towing tongue 18 has been pivoted to the solid line operative position thereof illustrated in FIGS. 2 and 4 of the drawings, the latch pin 44 may be inserted through the registered bores 40 and 42. Thereafter, the hitch coupling member 22 may be coupled to a compatable hitch member on the rear end of a draft vehicle and the latter may be utilized to pull the vehicle 10 from the water.

Of course, when placing the vehicle 10 within the water this procedure is reversed. However, if it is desired to exercise more control over the raising and lowering of the towing tongue 18 and running gear, the winch assembly 92 may be utilized, as opposed to being allowed to free wheel, to winch the towing tongue 18 and running gear between the operative and inoperative positions thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, an elongated mobile structure having front and rear ends and including a body portion, elongated support arm means adjacent the rear end of said structure having one end portion pivotally secured to said body portion for oscillation about an axis extending transversely of said arm means and said mobile structure for swinging between a depending position and a generally horizontal position with other end portion of said arm means swung toward the front end of said structure, said other end of said arm means having ground engaging support wheel means journaled therefrom, an elongated lever pivotally secured intermediate its opposite ends, to said front end of said structure for oscillation about an axis generally paralleling the first mentioned axis between a position extending generally longitudinally of said structure and an upstanding position, and elongated link means extending longitudinally of said structure and pivotally secured at its rear end to said other end portion of said arm means and at its forward end to the rear end of said lever, said link means interconnecting said lever and said arm means for generally horizontal positioning of said lever when said arm means is in said depending position and generally vertical upstanding positioning of said lever when said arm means is in a forwardly projecting generally horizontal position, the forward end of said lever projecting forwardly of said body portion when said lever is in said horizontal position and including a hitch member for securement to a draft vehicle.

2. The combination of claim 1 wherein said arm means comprises a pair of interconnected opposite side arms, a transverse axle member supported from the free ends of said arms, said wheel means comprises support wheels journaled from the opposite ends of said axle member.

3. The combination of claim 2 wherein said transverse axle member is journaled from the free ends of said arms, the opposite ends of said axle member includes crank arms, the free ends of said crank arms including stub axle portions on which said wheels are journaled, and spring means connected between said axle member and said arm means yieldingly urging said axle member toward an angular position with said crank arms in trailing rearwardly and downwardly inclined positions.

4. The combination of claim 1 wherein the axis of oscillation of said lever is disposed appreciably above a path extending between the opposite ends of said lever when the latter is in the horizontal position thereof, and the rear end of said lever, when the latter is in said upstanding position thereof, is elevated above the position thereof assumed when said lever is in horizontal position.

5. The combination of claim 1 including means, independent of said lever, operatively connected between said arm means and said body portion for swinging said arm means between said depending and generally horizontal positions.

6. The combination of claim 1 wherein said body portion and said lever including coacting means for releasably securing said lever in said upstanding position.

7. The combination of claim 1 wherein said body portion and the forward end portion of said link means include coacting means for releasably securing said link means in a forwardly displaced position.

8. The combination of claim 1 wherein said body portion comprises a platform structure, a pair of opposite side longitudinally extending horizontal pontoon assemblies dependingly supported from opposite side portions of said platform structure.

9. The combination of claim 8 wherein said wheel means are received upwardly between said pontoon assemblies when said arm means is disposed in the generally horizontal position thereof.

* * * * *